United States Patent
Furuichi et al.

(10) Patent No.: US 12,412,425 B2
(45) Date of Patent: Sep. 9, 2025

(54) ESTIMATION SYSTEM, ESTIMATION METHOD, AND RECORDING MEDIUM RECORDING ESTIMATION PROGRAM

(71) Applicant: SHARP KABUSHIKI KAISHA, Sakai (JP)

(72) Inventors: Gaku Furuichi, Sakai (JP); Hiroshi Ishida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 660 days.

(21) Appl. No.: 17/852,708

(22) Filed: Jun. 29, 2022

(65) Prior Publication Data

US 2023/0028063 A1    Jan. 26, 2023

(30) Foreign Application Priority Data

Jul. 21, 2021    (JP) ................. 2021-120342

(51) Int. Cl.
*G06N 3/04* (2023.01)
*G06V 10/764* (2022.01)
*G06V 10/82* (2022.01)
*G06V 40/16* (2022.01)

(52) U.S. Cl.
CPC ............ *G06V 40/178* (2022.01); *G06N 3/04* (2013.01); *G06V 10/764* (2022.01); *G06V 10/82* (2022.01)

(58) Field of Classification Search
CPC .... G06V 40/178; G06V 10/764; G06V 10/82; G06N 3/04; G06N 3/0464; G06N 3/09
USPC ........................................ 382/181
See application file for complete search history.

(56) References Cited

U.S. PATENT DOCUMENTS

| 2010/0208051 A1* | 8/2010 | Tsurumi | G06V 40/173 |
| | | | 382/190 |
| 2021/0004568 A1* | 1/2021 | Uno | G06V 40/172 |
| 2022/0198830 A1* | 6/2022 | Li | G06V 40/178 |

FOREIGN PATENT DOCUMENTS

| CN | 112149449 A | 12/2020 |
| JP | 4888217 B2 | 2/2012 |
| WO | 2016/152121 A1 | 9/2016 |

OTHER PUBLICATIONS

Philipp Terhorst et al., "Reliable Age and Gender Estimation from Face Images: Stating the Confidence of Model Predictions", 2019 IEEE 10th International Conference on Biometrics Theory, Applications and Systems (BTAS), DOI: 10.1109/BTAS46853.2019.9185975, Sep. 23-26, 2019.

* cited by examiner

*Primary Examiner* — Charlotte M Baker
(74) *Attorney, Agent, or Firm* — ScienBiziP, P.C.

(57) ABSTRACT

An estimation system includes: an acquisition processor that acquires a captured image of an object to be estimated; and an estimation processor that uses a single learned model generated on the basis of learning data, in which an image of the object to be estimated is associated with each of a plurality of attributes of the object to be estimated, to estimate a first attribute included in the plurality of attributes, from a first output value of a first output layer corresponding to the first attribute and to estimate a second attribute included in the plurality of attributes, from a second output value of a second output layer corresponding to the second attribute, with the captured image acquired by the acquisition processor as an input image.

10 Claims, 9 Drawing Sheets

ESTIMATION SYSTEM, ESTIMATION METHOD, AND RECORDING MEDIUM RECORDING ESTIMATION PROGRAM

INCORPORATION BY REFERENCE

This application is based upon and claims the benefit of priority from the corresponding Japanese Patent Application No. 2021-120342 filed on Jul. 21, 2021, the entire contents of which are incorporated herein by reference.

BACKGROUND

The present disclosure relates to an estimation system that estimates an attribute of an object to be estimated, an estimation method, and a recording medium recording an estimation program.

Conventionally, there is known a technology for estimating an attribute such as age and gender of a person from a face image of the person. For example, there is known a technology for calculating a score representing the probability that a face of a person in an image corresponds to an age group for each of a plurality of predetermined age groups, specifying a portion of the image that adversely affects attribute estimation on the basis of a state of the face, correcting the score such that the effect of the portion is reduced, and regarding, as an attribute of the person, the age group corresponding to the corrected score representing the highest probability among the corrected scores for the respective age groups.

In addition, there is known a technology for estimating a user's age group by comparing feature information of a face image with feature information stored by a learning result storage.

Herein, a convolutional neural network (CNN) which is one of deep learning methods is generally used, as a method for estimating the attribute of the person from the image of the person. In the convolutional neural network, an input image is read, convolution and pooling are repeated in the first half, important and a plurality of features in the input image are extracted, and identification (classification) by a fully connected layer and an output layer is performed on the basis of those features in the second half.

In the conventional method for estimating the gender and age of a person from the face of the person by using, for example, the above convolutional neural network, the following problems arise. For example, in the case of a method for estimating gender and age collectively as a pair by a single learned model, the number of outputs (fully connected number) is large. Specifically, the fully connected number is the number (2×N×m) obtained by multiplying the number of genders "2", the number of age classes "N", and the number of nodes "m" in a fully connected layer. Therefore, a problem that the amount of calculations in the estimation process is increased, and the processing load is increased occurs.

Further, a method for estimating gender and age of a person by using two learned models, for example, a learned model that estimates gender and a learned model that estimates age by using the estimation result of gender is considered. However, in this method, when an error occurs in the gender estimation, an error also occurs in the age estimation. Therefore, a problem of inadequate estimation accuracy occurs.

Thus, in the conventional technologies, in a case where for an object to be estimated (for example, a person), a plurality of attributes (for example, gender and age) of the object to be estimated are estimated, it is difficult to improve estimation accuracy while reducing a load on an estimation process.

An object of the present disclosure is to provide an estimation system, an estimation method, and a recording medium recording an estimation program, which can improve estimation accuracy while reducing a load on an estimation process, in a case where a plurality of attributes of an object to be estimated are estimated for the object to be estimated.

SUMMARY

An estimation system according to an aspect of the present disclosure is a system including an acquisition processor that acquires a captured image of an object to be estimated; and an estimation processor that uses a single learned model generated on the basis of learning data, in which an image of the object to be estimated is associated with each of a plurality of attributes of the object to be estimated, to estimate a first attribute included in the plurality of attributes, from a first output value of a first output layer corresponding to the first attribute and to estimate a second attribute included in the plurality of attributes, from a second output value of a second output layer corresponding to the second attribute, with the captured image acquired by the acquisition processor as an input image.

An estimation method according to another aspect of the present disclosure is a method for performing, by one or more processors: acquiring a captured image of an object to be estimated; and using a single learned model generated on the basis of learning data, in which an image of the object to be estimated is associated with each of a plurality of attributes of the object to be estimated, to estimate a first attribute included in the plurality of attributes, from a first output value of a first output layer corresponding to the first attribute and to estimate a second attribute included in the plurality of attributes, from a second output value of a second output layer corresponding to the second attribute, with the captured image acquired by the acquiring as an input image.

A recording medium according to another aspect of the present disclosure is a recording medium recording a program for causing one or more processors to perform: acquiring a captured image of an object to be estimated; and using a single learned model generated on the basis of learning data, in which an image of the object to be estimated is associated with each of a plurality of attributes of the object to be estimated, to estimate a first attribute included in the plurality of attributes, from a first output value of a first output layer corresponding to the first attribute and to estimate a second attribute included in the plurality of attributes, from a second output value of a second output layer corresponding to the second attribute, with the captured image acquired by the acquiring as an input image.

According to the present disclosure, it is possible to provide an estimation system, an estimation method, and a recording medium recording an estimation program, which can improve estimation accuracy while reducing a load on an estimation process, in a case where a plurality of attributes of an object to be estimated are estimated for the object to be estimated.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. The following embodiment is merely an example that embodies the present disclosure, and does not intend to limit the technical scope of the present disclosure.

An estimation system 1 according to this embodiment is a system that estimates each of a plurality of attributes in an image on the basis of the image which is an object to be estimated. Examples of the above object to be estimated include a person's face, a vehicle, an animal, and an object. In a case where the object to be estimated is a person, the plurality of attributes include the gender and the age of the person. The plurality of attributes may include whether or not the person has glasses, whether or not the person has a mask, ethnicity type, and the like. In a case where the object to be estimated is a vehicle, the plurality of attributes include the vehicle's license plate number, a maker, a domestic/foreign car, color, and the like.

The estimation system 1 is applied, for example, a digital signage, so that it is possible to estimate the gender and the age of a passenger on a street, in a store or the like, and analyze human flow, marketing, or the like. In addition, the estimation system 1 is applied, for example, to a POS terminal in a store, for example, so that it is possible to estimate gender and age of a customer and perform marketing and other activities.

In this embodiment, while a face of a person is taken as an example of the object to be estimated, and gender and age of the person are taken as an example of the plurality of attributes, description will be made. That is, a face of a person is an example of the object to be estimated of the present disclosure, and the gender of the person is an example of a first attribute of the present disclosure, and the age of the person is an example of a second attribute of the present disclosure. The number of attributes to be estimate by the estimation system 1 is not limited to two, but may be three or more.

Figure 1:
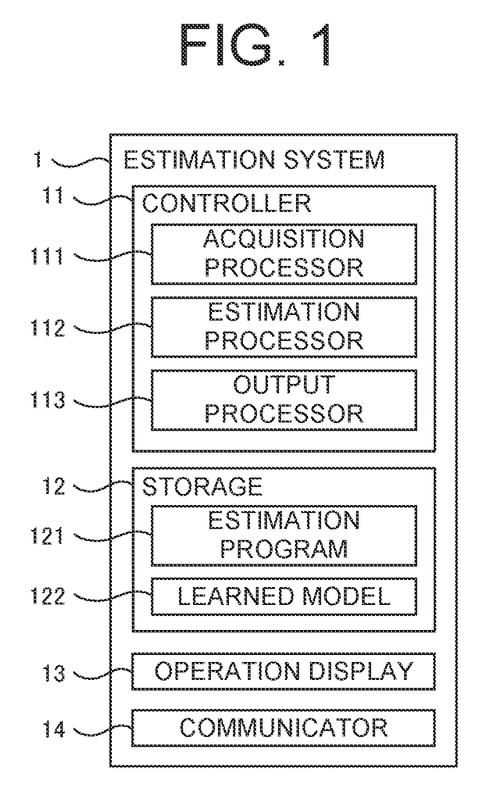
FIG. 1 is a block diagram illustrating a configuration of an estimation system according to an embodiment of the present disclosure.

FIG. 1 is a diagram of a schematic configuration of the estimation system 1 according to the embodiment of the present disclosure. As illustrated in FIG. 1, the estimation system 1 includes a controller 11, a storage 12, an operation display 13, and a communicator 14. The estimation system 1 may be an information processing device such as a personal computer.

The communicator 14 is a communication interface for connecting the estimation system 1 to a network by wired or wireless connection, and for executing data communication according to a predetermined communication protocol with other devices via the network.

The operation display 13 is a user interface including: a display such as a liquid crystal display or an organic EL display that displays various types of information; and an operation acceptor such as a mouse, a keyboard, and a touch panel that receive operation.

The storage 12 includes a nonvolatile storage device such as a hard disk drive (HDD) and a solid state drive (SSD) that store various types of information. The storage 12 stores a control program such as an estimation program 121 for causing the controller 11 to perform an estimation process (see FIG. 9) described below. The control program such as the estimation program 121 is recorded on a computer-readable temporary recording medium to be provided, is read from the temporary recording medium by a reading device of the estimation system 1 and stored in the storage 12. The control program may be provided (downloaded) to the estimation system 1 via a network from an external server or the like other than the estimation system 1 and stored in the storage 12. The storage 12 also stores the learned model 122 that is machine learned by a learning method described below, information such as an estimation result estimated by the estimation system 1.

The controller 11 has control devices such as a CPU, a ROM, and a RAM. The CPU is a processor that executes various types of arithmetic processes. The ROM is a non-volatile storage that stores, in advance, a control program such as a BIOS and an OS for causing the CPU to execute various types of processes. The RAM is a volatile or non-volatile storage that stores various types of information, and is used as a temporary storage memory (working area) for the various types of processes executed by the CPU. The controller 11 controls the estimation system 1 by causing the CPU to execute various control programs stored in advance in the ROM or the storage 12.

Herein, a convolutional neural network (CNN), which is one of deep learning methods, is generally used as a method for estimating the attributes of the person from his or her image. In the convolutional neural network, an input image is read, convolution and pooling are repeated in the first half, important and a plurality of features in the input image are extracted, and identification (classification) by a fully connected layer and an output layer is performed on the basis of those features in the second half.

Figure 2:
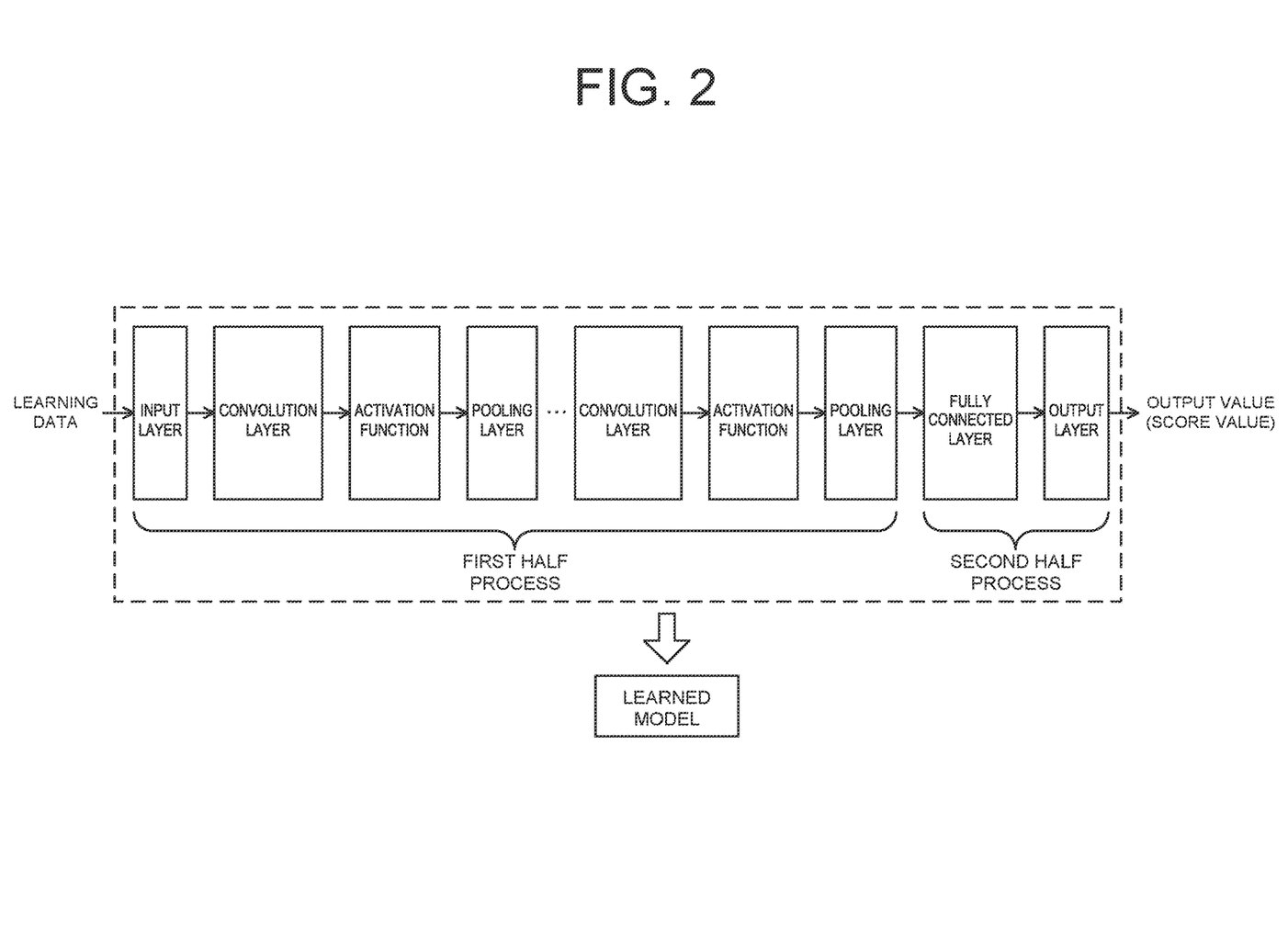
FIG. 2 is a diagram illustrating an example of a basic structure of a convolutional neural network according to the embodiment of the present disclosure.

FIG. 2 illustrates a basic structure of the convolutional neural network. The convolutional neural network reads learning data, extracts important multiple features in the learning data by repeating convolution and pooling in the first half, and performs identification by using the fully connected layer and the output layer on the basis of those features in the second half.

Specifically, in the input layer of the first half process, an input image, which is learning data, is converted from multidimensional (three-dimensional data having two dimensions of the image and one dimension of the color components RGB) to one-dimensional vector. In the next convolution layer, features such as edge extraction are extracted by detection of shading patterns in the input image. In the next pooling layer, misalignment is allowed and the image size (information) is compressed such that the object is considered to be the same object even when a position of the object varies, by thinning to only those important features extracted. A plurality of convolution layers and pooling layers are connected, so that more important features are extracted. Herein, when the number of convolution layers and pooling layers increases, the magnitude (gradient) of the feature disappears, and therefore an activation function is inserted after the convolution layer, so that the feature amount is emphasized and the loss of gradient is suppressed. In the second half process, classification based on the feature amount extracted in the first half process is performed.

Figure 3:
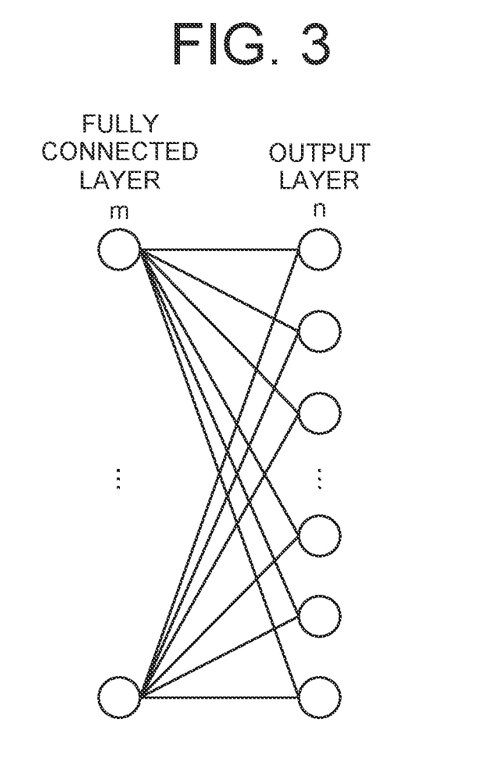
FIG. 3 is a diagram schematically illustrating a connection state of a fully connected layer and an output layer included in the convolutional neural network according to the embodiment of the present disclosure.

FIG. 3 schematically illustrates a connection state of the fully connected layer and the output layer. Each of circled items is an individual node, and a connection weighting factor is multiplied for each of the connection lines between nodes. The number of connections is calculated by the node number (m) in the fully connected layer×the output number (n) of the output layer, and as the number of connections increases, classifying capability is improved. However, an arithmetic amount is increased by the increased number, and performance is lowered. In addition, there is another problem that it takes time to calculate an optimal connection weighting factor during learning. In the fully connected layer (see FIG. 2), the features extracted in the first half is aggregated into a single node and converted into a feature variable by adjusting the connection weighting factor between nodes in order to perform classification. Then, in the last output layer (see FIG. 2), the feature variable is output as such a score value that maximizes the probability of being classified correctly. Output values (score values) of the output layers that are added collectively results in 1.0 (100%).

In a case where attributes (gender and age) of a person in a face image are estimated, an estimation method based on the above convolutional neural network is generally used. Learning data (a plurality of face images) is used as an input image, and various feature amounts in the learning data are extracted, and a configuration of a first half process is changed or various parameters (connection weighting factor of the fully connected layer) are adjusted such that the output value of the output layer approaches a correct value (the gender, the age, and the range (class) to which the age corresponds) for the learning data of the input image on an overall average. The configuration optimized by machine learning and the estimated parameters are then summarized as a "learned model" (see FIG. 2).

By inputting the face image of the person, which is the object to be estimated, into the learned model generated by machine learning by using such a learning method, it is possible to estimate gender and age of the person from the output values (score values).

Figure 4A:
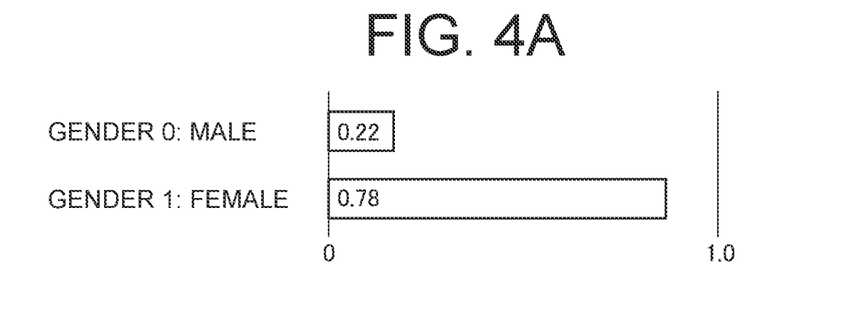
FIG. 4A is a diagram schematically illustrating an example of an estimation method of gender according to the embodiment of the present disclosure.
Figure 4B:
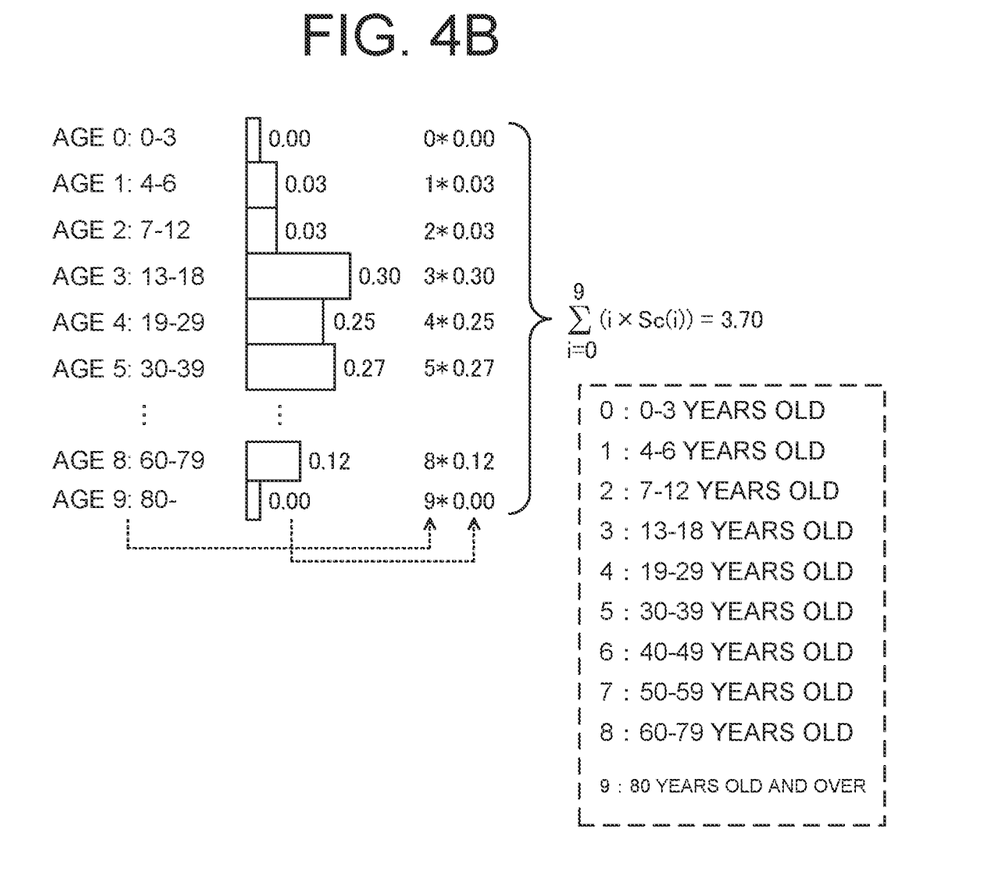
FIG. 4B is a diagram schematically illustrating an example of an estimation method of age according to the embodiment of the present disclosure.

The following is an example of an estimation method for estimating gender and age from an image of a person. FIG. 4A schematically illustrates an estimation method for gender, and FIG. 4B schematically illustrates an estimation method for age.

For example, a gender with a larger score value in the output layer is used as the estimation result. In this example, a score value corresponding to a male is 0.22 and a score value corresponding to a female is 0.78 (=1.0−male score value). Therefore, the person as the object to be estimated is estimated to be a female.

The estimated age is calculated by performing product-sum operation of each age class ID (node number of the output layer) and the score value corresponding to each age class ID. The age class represents a range of ages separated by a specific age. In this case, the result of the product-sum operation is 3.70, and when the decimal point is rounded down, the age class ID is "3," and therefore the corresponding age class is estimated to be "13 to 18 years old". Furthermore, by adding the decimal point "0.70" and linearly interpolating within the same age class, the age can also be estimated to be 13+0.70×(18−13)=16.5 years old.

These score values are variable, and therefore it is desirable to estimate the gender and the age by the average value of a plurality of the input images.

Figure 5:
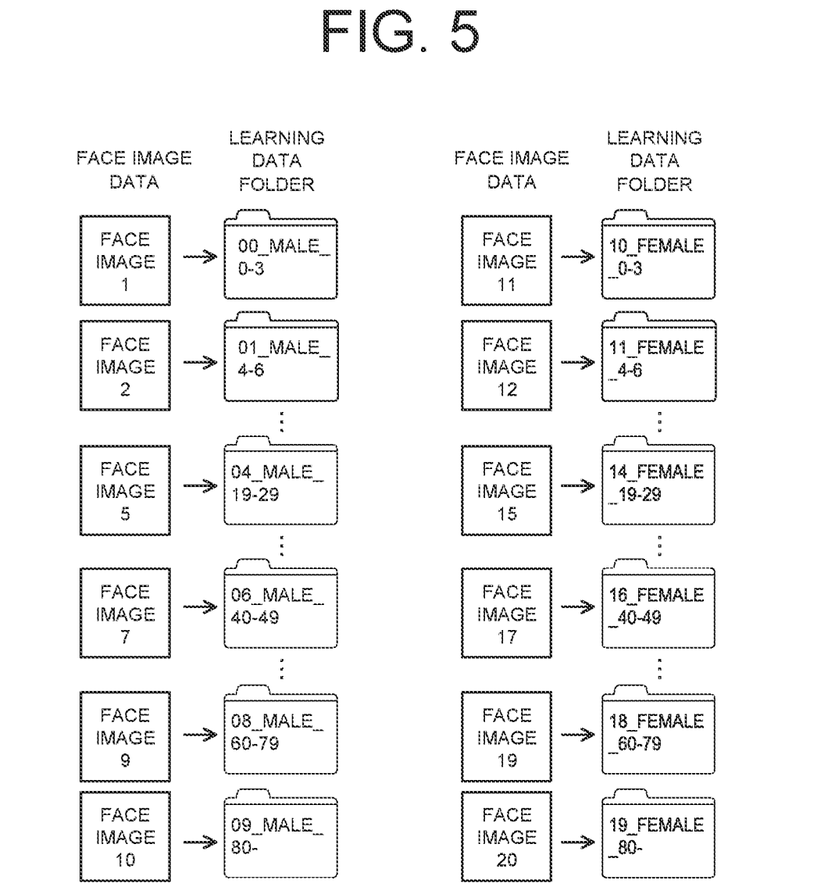
FIG. 5 is a diagram illustrating an example of learning data according to the embodiment of the present disclosure.

Herein, FIG. 5 illustrates an example of learning data used for machine learning when a learned model is generated. Each of face images 1 to 10 represents a face image of a male person in each age range, and each of the face images 11 to 20 represents a face image of a female person in each age range. Each learning data folder is assigned a folder name, for example, "serial number#gender#lower age limit-upper age limit" as the folder name. Each learning data folder stores a plurality of pieces of face image data corresponding to that age range, and the plurality of pieces of face image data are collectively defined as learning data (learning data set). The "number of age classes" is the number of age categories into which the age groups are divided. In this example, there are "10 classes" for each gender, and therefore the total number of age classes for both male and female genders is "20 classes".

The learning data itself is not stored in the learned model, but the features are extracted using a convolutional neural network, and the collected features that obtain the optimal configuration and parameters so as to output an estimated value which matches the learning data becomes the learned model.

The following problems arise in a conventional method for estimating the gender and the age of a person from a face of the person by using, for example, the aforementioned convolutional neural network. For example, in the case of a method for estimating gender and age collectively as a pair by a single learned model A, the number of outputs (fully connected number) is large. Specifically, the fully connected number is the number (2×N×m) obtained by multiplying the number of genders "2", the number of age classes "N", and the number of nodes "m" in a fully connected layer. Therefore, a problem that the amount of calculations in the estimation process is increased, and the processing load is increased occurs. A specific example of this problem will be described below.

Figure 6:
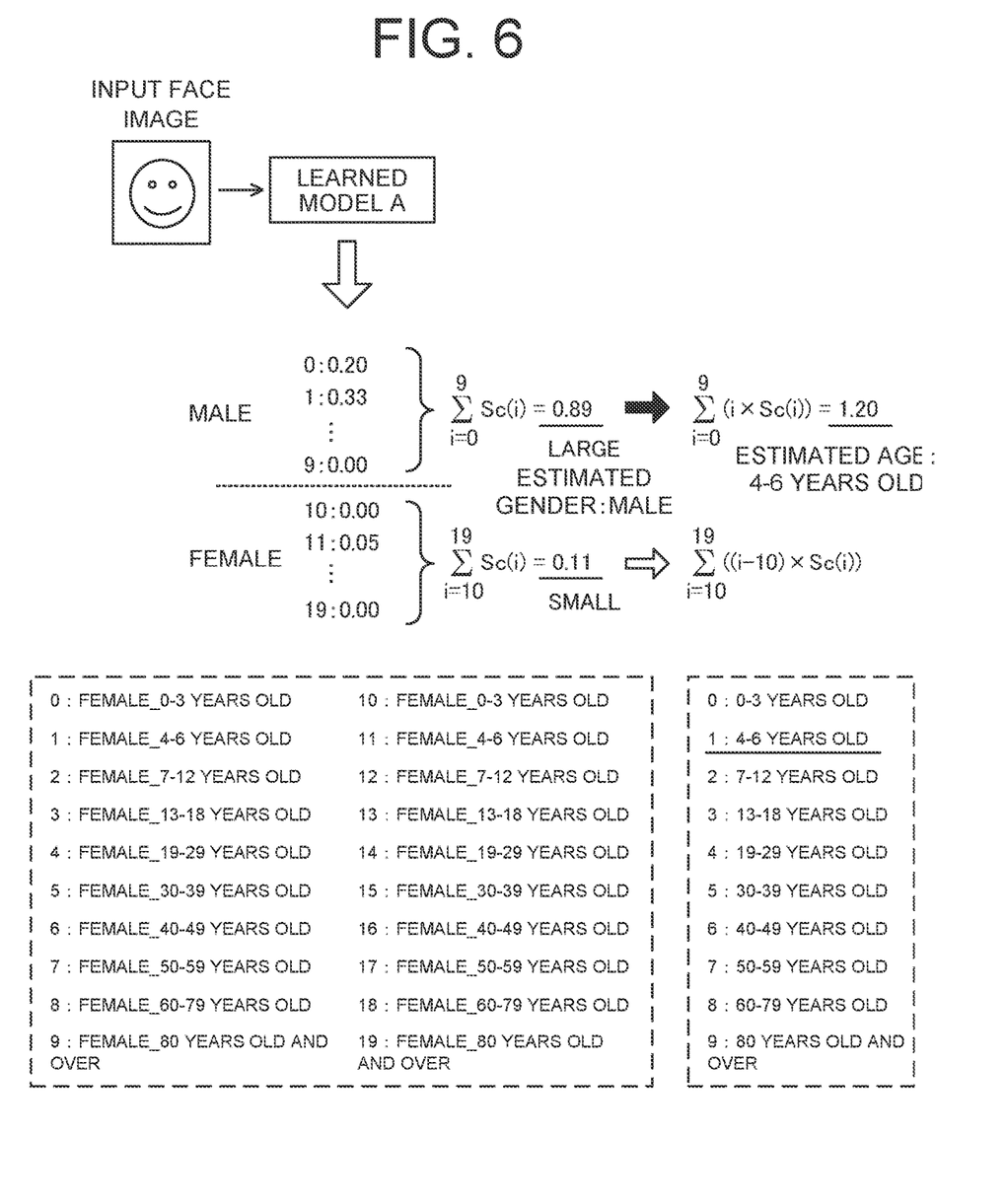
FIG. 6 is a diagram illustrating an example of an estimation method by a conventional learned model.

FIG. 6 schematically illustrates an estimation method using the conventional learned model A. The learned model A estimates the gender and the age of a person collectively as a pair, and consists of a single learned model.

In this estimation method, the number of outputs is the number of all combinations of gender and age classes, and therefore the total number of combinations is "20" in the example in FIG. 6. Score values are then calculated at each output layer. The sum of all score values is "1".

First, the sum of score values corresponding to ID (i)=0 to 9 in the output layer (degree of male) is compared with the sum of score values corresponding to ID (i)=10 to 19 in the output layer (degree of female), and the larger one of the two is estimated to be the gender. Herein, the male degree is "0.89" and the female degree is "0.11", and therefore the gender of the input face image is estimated to be a male.

Next, the age of the face image is estimated by product-sum operation of the IDs of the output layers corresponding to the estimated gender and their score values. In this case, since the image is already determined to be a male, and therefore the product-sum operation of ID (i)=0 to 9 in the corresponding output layer and the respective score values is "1.20", and therefore the age of the face image is estimated to be the age class of "4 to 6 years old". In the case of females, ID (i)=10 to 19 in the output layer, and therefore the product-sum operation is performed after subtracting the number of male age classes "10" from the ID value.

In the estimation method using the learned model A, all gender classes and age classes are combined, and therefore when the gender is "2," the number of age classes is "N," and the number of nodes in the fully connected layer is "m," the fully connected number is "2×N×m". Thus, the problem that the arithmetic amount of the estimation process increases and a processing load increases arises.

As another estimation method, for example, a method for estimating gender and age of a person by using two learned models, namely, a learned model B1 that estimates gender, and a learned model B2 that estimates age by using an estimation result of the gender can be considered. However, in this method, when an error occurs in the gender estimation, the age estimation will also be incorrect. Therefore, a problem of inadequate estimation accuracy occurs. A specific example of this problem will be described below.

Figure 7:
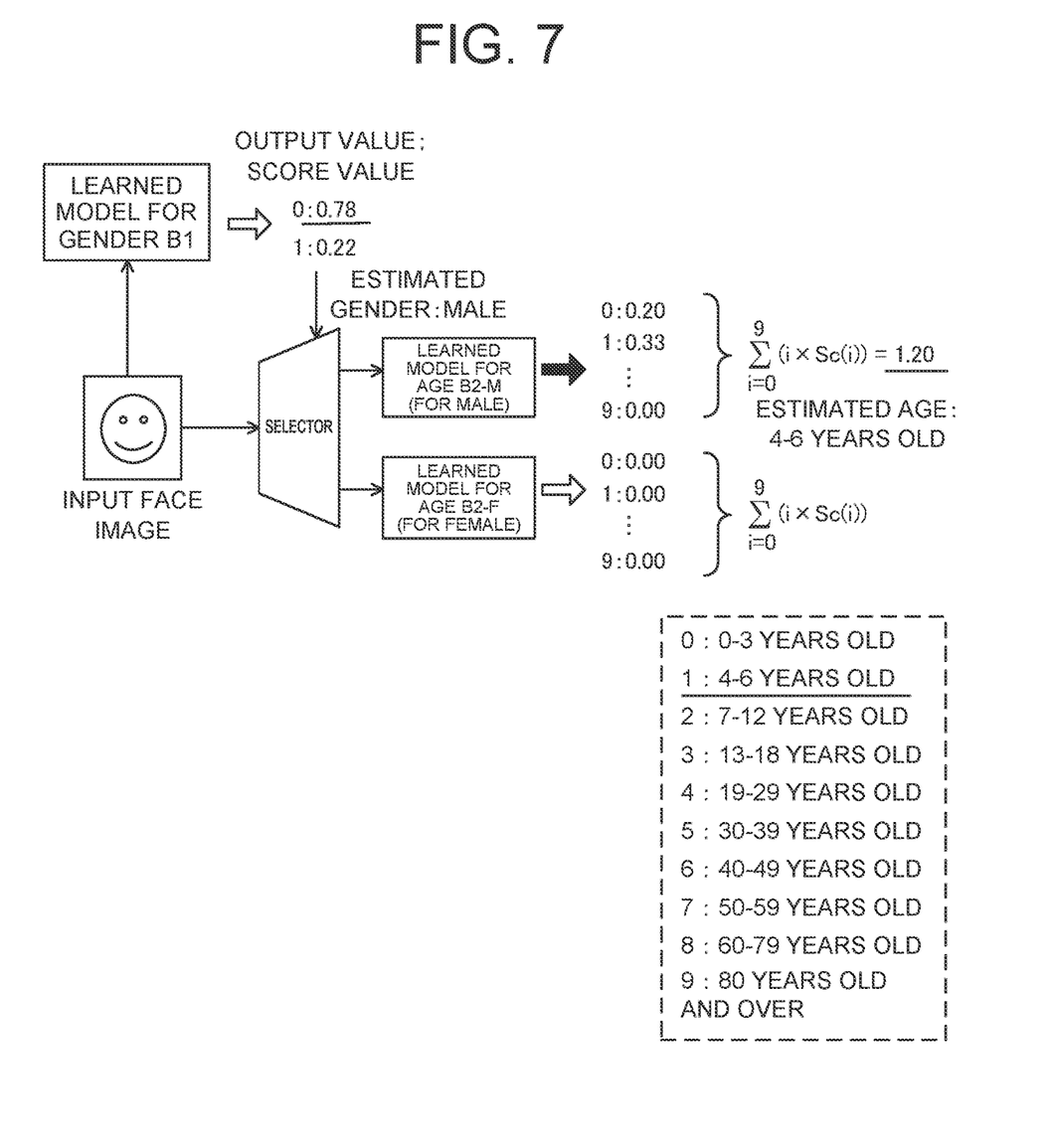
FIG. 7 is a diagram illustrating an example of an estimation method by a conventional learned model.

FIG. 7 schematically illustrates a conventional estimation method using the two learned models B1 and B2. In the estimation method illustrated in FIG. 7, the gender of the face image is first estimated by the learned model B1 in the first stage, and in accordance with the result, the age of the face image is estimated by a learned model B2-M (for males) or a learned model B2-F (for females) of either the male or the female.

In this estimation method, first, the score value for males is "0.78" and the score value for females is "0.22", and therefore the gender of the input face image is estimated to be a male.

Next, the age is estimated using the learned model B2-M for age for males. By the product-sum operation of ID (i)=0 to 9 in the output layer and the respective score values, "1.20" is obtained, and therefore the age of the face image is estimated to be in the age class of "4 to 6 years old". In a case where the gender is determined to be a female, the learned model B2-F for female age is used, the age is estimated in the same method as that for the male case.

Thus, in the estimation method illustrated in FIG. 7, the gender and the age are estimated separately and stepwise. The fully connected number is "m×(2+N)", and is less than the learned model A (see FIG. 6). However, a total of three learned models, namely, the one learned model B1 for gender estimation, the learned model B2-M for age estimation for males, and the learned model B2-F for age estimation for females are needed. In a case where the three learned models are applied, memory increases and reduces performance because after the gender is estimated, the age is estimated for the estimated gender. Furthermore, in a case where the gender is incorrectly estimated, the subsequent age estimation will also be incorrect, and therefore estimation accuracy is lowered.

Thus, in the conventional estimation method (see FIG. 6 and FIG. 7), in a case where a plurality of attributes (for example, gender and age) of an object to be estimated (for example, a person) is estimated for the object to be estimated, it is difficult to improve the estimation accuracy while reducing the load on the estimation process. In contrast, according to the estimation system 1 of this embodiment, as described below, in a case where a plurality of attributes of an object to be estimated is estimated for the object to be estimated, it is possible to improve the estimation accuracy while reducing the load on the estimation process.

Specifically, the controller 11 of the estimation system 1 according to this embodiment includes various processors such as an acquisition processor 111, an estimation processor 112, and an output processor 113, as illustrated in FIG. 1. The controller 11 functions as the above various processors by executing various processes according to the estimation program 121 with the CPU. Some or all of the processors included in the controller 11 may be composed of an electronic circuit. The estimation program 121 may be a program for causing a plurality of processors to function as the above various processors.

The controller 11 functions as the above various processors by executing various processes according to the estimation program 121 by using the learned model 122. Some or all of the processors included in the controller 11 may be composed of an electronic circuit. The estimation program 121 may be a program for causing a plurality of processors to function as the above various processors.

Herein, the learned model 122 is a single learned model generated on the basis of learning data in which an image (for example, a face image) of an object to be estimated (for example, a person), a first attribute (for example, gender) of the object to be estimated, and a second attribute (for example, age) of the object to be estimated are associated with each other. The learned model of the present disclosure may be generated on the basis of learning data in which an image of an object to be estimated and each of the three or more attributes of the object to be estimated are associated with each other.

Figure 8:
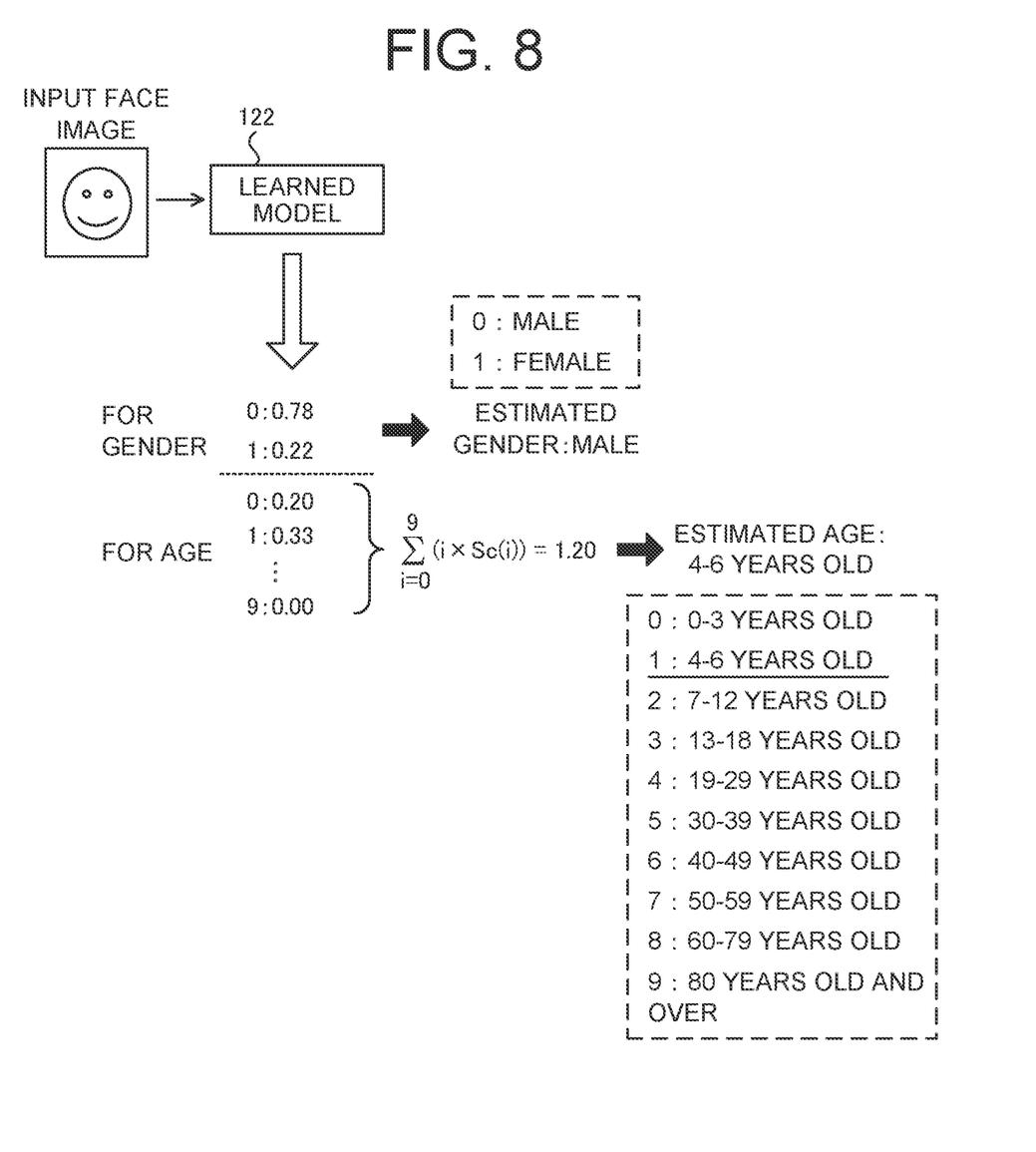
FIG. 8 is a diagram illustrating an example of an estimation method by a learned model according to the embodiment of the present disclosure.

FIG. 8 schematically illustrates the estimation method using the learned model 122 according to this embodiment. In the learned model 122, an output layer for gender and an output layer for age are provided separately in the output layer, and the sum of output values (score values) of each output layer is "1".

The acquisition processor 111 acquires an captured image of the object to be estimated. Herein, the acquisition processor 111 acquires the face image of the person which is the object to be estimated. For example, the acquisition processor 111 acquires the face image of the person captured by a camera (not illustrated) connected to the estimation system 1 via a network, from the camera via the communicator 14. The acquisition processor 111 sequentially acquires the face image captured by the camera at a predetermined frame rate. The camera may be included in the estimation system 1. The acquisition processor 111 is an example of an acquisition processor of the present disclosure.

The estimation processor 112 uses the single learned model 122 to estimate gender from a first output value of a first output layer corresponding to the gender and to estimate age from a second output value of a second output layer corresponding to the age, with the face image acquired by the acquisition processor 111 as an input image. The estimation processor 112 simultaneously estimates the gender and the age from the input face image by using the single learned model 122. The estimation processor 112 is an example of an estimation processor of the present disclosure.

Specifically, the estimation processor 112 calculates the first output value for each of a plurality of classifications of gender (gender classes), and estimates the gender of the face image on the basis of the plurality of calculated first output values. The estimation processor 112 also calculates the second output value for each of a plurality of classifications of age (age classes), and estimates the age of the face image on the basis of the plurality of calculated second output values.

The estimation processor 112 outputs a total number of the output values, which is the sum of the number of gender classifications (number of genders) and the number of age classifications (number of age classes). For example, the estimation processor 112 outputs the output value (second output value) which is the sum of the number of "12" (the second output value) obtained by summing up the total number of gender classifications "2" and the total number of age classifications "10".

Then, the estimation processor 112 estimates the age of the person in the face image on the basis of the result of the product-sum operation of the second output value calculated for each of the plurality of age classes and the corresponding age classes.

In the case of the example illustrated in FIG. 8, the estimation processor 112 estimates the gender of the face image to be a male because the first output value (score value) for males is "0.78" and the second output value (score value) for females is "0.22", out of the two gender classifications (males and females).

The estimation processor 112 also estimates the age of the face image by the product-sum operation of ID (i)=0 to (N−1) (N is the number of age classes) in the output layer for age, and the respective score values (second output values). Herein, the number of age classes is "10", and as a result of the product-sum operation of ID (i)=0 to 9 in the output layer, and the respective score values, the estimation processor 112 estimates that the age of the face image belongs to the age class of "4 to 6 years old" because the result of the sum operation is "1.20". The estimation processor 112 estimates the age by the same method, even in a case where the gender is estimated to be a male or even in a case where the gender is estimated to be a female.

Herein, the estimation processor 112 calculates the age corresponding to the second output value by linear interpolation using the minimum age and the maximum age among the plurality of ages included in the estimated age classes. In the example illustrated in FIG. 8, in the estimated age class "4 to 6 years old", the minimum age is "4 years old" and the maximum age is "6 years old". Therefore, the estimation processor 112 calculates the estimated age to be 4.4 years old (=4+0.20×(6−4)).

The output processor 113 outputs the estimation results. For example, the output processor 113 causes the operation display 13 to display the estimated result ("male", "4 to 6 years old" or "4.4 years old") estimated for the input face image. The output processor 113 may also transmit the above estimation results to other devices via the communicator 14.

According to the estimation method according to this embodiment, like the conventional learned model A (see FIG. 6), the learned model 122 is a single learned model and can estimate gender and age simultaneously. However, the fully connected number is "m×(2+N)", and is less than the fully connected number "2×N×m" in the learned model A. Therefore, the learning time is shorter than that by the learned model A. The gender and the age can be estimated simultaneously by the single learned model 122, and therefore memory can be reduced, and performance can be improved. Furthermore, unlike the conventional learned model B, the age can be estimated without depending on the gender estimation result, and therefore it is possible to improve estimation accuracy.

Estimation Process

Figure 9:
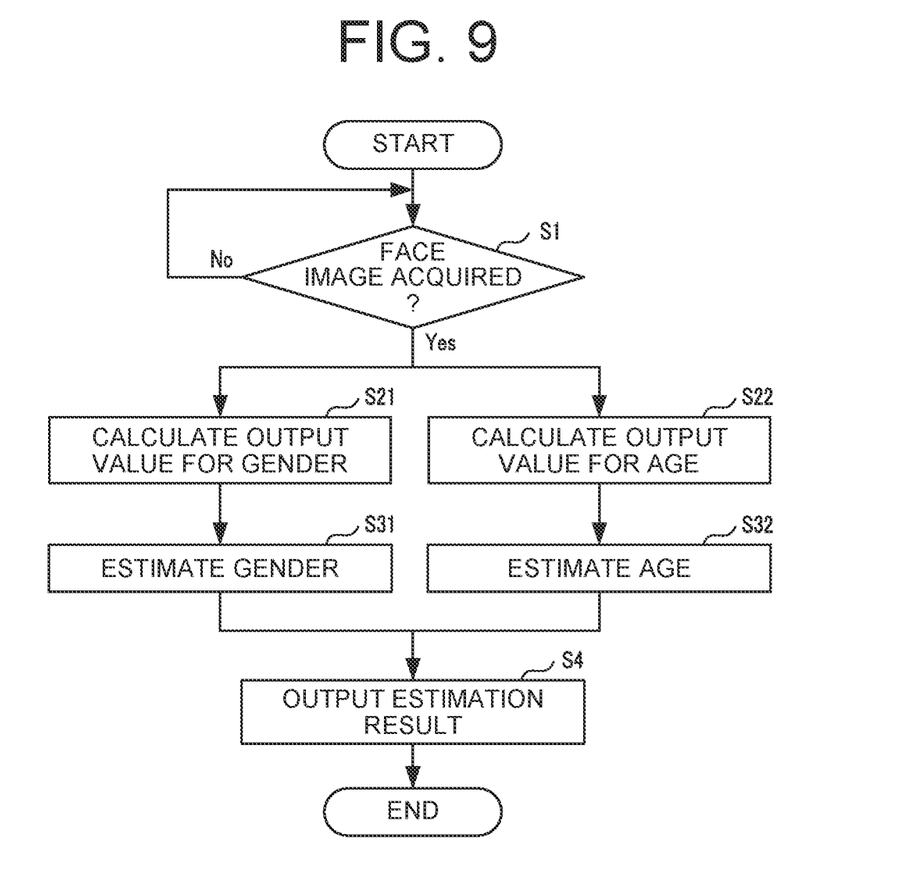
FIG. 9 is a flowchart for illustrating an example of the procedure of an estimation process performed in the estimation system according to the embodiment of the present disclosure.

Hereinafter, an example of the procedure of the estimation process performed by the controller 11 of the estimation system 1 will be described with reference to FIG. 9.

The present disclosure can be grasped as the disclosure of an estimation method for performing one or more steps included in the above estimation process. The one or more steps included in the above estimation process described herein may be omitted as appropriate. Each step in the estimation process may be executed in a different order to such an extent as to produce similar effects. Furthermore, a case where the controller 11 executes each step in the above estimation process will be described herein as an example, but in other embodiments, one or more processors may perform each step in the above estimation process in a distributed manner.

For example, the learned model 122 (see FIG. 8) that estimates the gender and the age of a person is applied to the estimation system 1. The controller 11 performs the estimation process in accordance with the estimation program 121 by using the learned model 122.

First, in Step S1, the controller 11 determines whether or not a face image which is an object to be estimated is acquired. When the controller 11 acquires the face image (S1: Yes), the process proceeds to Steps S21 and S22. Step S1 is an example of acquiring of the present disclosure.

In Step S21, the controller 11 calculates the first output values (score values) corresponding to gender. Specifically, the controller 11 calculates the first output value of the first output layer for each of males and females. For example, as illustrated in FIG. 8, the controller 11 calculates "0.78" as the first output value (score value) for males and "0.22" is calculated as the first output value (score value) for females.

In Step S31, which follows Step S21, the controller 11 estimates the gender of the face image. For example, the controller 11 estimates the gender with the higher score value as the gender of the object to be estimated. Herein, the controller 11 estimates the gender of the face image to be a male with a score value of "0.78". After Step S31, the process proceeds to Step S4.

On the other hand, in Step S22, the controller 11 calculates the second output values (score values) corresponding to age. Specifically, the controller 11 calculates the score value (second output value) for each ID (i)=0 to (N−1)) in the output layer for age. For example, as illustrated in FIG. 8, the controller 11 calculates "0.20" as the score value for age class "0", 0.33" is calculated as the score value for age class "1", and "0.00" is calculated as the score value for age class "9". Thus, the controller 11 calculates 10 score values (second output values) corresponding to the respective age classes.

In Step S32, which follows Step S22, the controller 11 estimates the age of the face image. For example, the controller 11 estimates age by the product-sum operation of the ID (i)=0 to (N−1) (N is the number of age classes) in the output layer for age and the respective score values (second output values). Herein, the number of age classes is "10" and the product-sum operation of ID (i)=0 to 9 in the output layer and the respective score values results in "1.20", and therefore the controller 11 estimates that the age belongs to the age class of "4 to 6 years old". The controller 11 may estimate the estimated age to be 4.4 years old (=4+0.20× (6−4)) by linear interpolation. After Step S32, the process proceeds to Step S4.

Thus, the controller 11 performs the gender estimation process of Steps S21 and S31 and the age estimation process of Steps S22 and S32 separately in parallel using the single learned model 122. The controller 11 also executes the gender estimation process and the age estimation process together (or simultaneously). Steps S21 and S31, and Steps S22 and S32 are examples of estimation steps in this disclosure of the present disclosure.

In Step S4, the controller 11 outputs the estimation result. For example, the controller 11 causes the operation display 13 to display the estimation result ("male" and "4 to 6 years old") estimated for the input face image. The controller 11 may also transmit the estimation results to other devices via the communicator 14.

As described above, the estimation system 1 according to this embodiment acquires a captured image of an object to be estimated, and uses the single learned model 122 generated on the basis of learning data, in which an image of the object to be estimated is associated with each of a plurality of attributes of the object to be estimated, to estimate a first attribute included in the plurality of attributes, from a first output value of a first output layer corresponding to the first attribute and to estimate a second attribute included in the plurality of attributes, from a second output value of a second output layer corresponding to the second attribute, with the captured image acquired by the acquisition circuit as an input image.

That is, the estimation system 1 estimates the plurality of attributes by the single learned model 122. The estimation system 1 generates the single learned model 122, in which a configuration and parameters optimized so as to be classified into the attribute information of the learning data are held, on the basis of the features extracted by the learning data which consists of a plurality of images and attribute information (such as gender and age) associated with the face images, and face image data having the same type (face) and the same resolution as the learning data is input to the learned model 122, so that desired attribute information is simultaneously output and estimated. In the estimation system 1, the number of outputs of the learned model 122 is the sum of the number of categories of each attribute information. In the case of gender and the number of age classes (N), the number of outputs is "2+N".

In addition, for the output value obtained by the product-sum operation of the output values belonging to the corresponding attribute information, an integer part specifies a division index of the output belonging to the corresponding attribute information, and a decimal part is a ratio of the attribute in a division index of the corresponding attribute, a difference between an upper limit value and a lower limit value of the division index of the corresponding attribute multiplied by the decimal part is added to the lower limit value, so that the estimation system 1 can obtain a more detailed estimated value in the category of the attribute.

This estimated value can also be applied in the estimation of gender. In the example in FIG. 8, the result of the product-sum operation is "0×0.78+1×0.22=0.22, the lower limit value of the corresponding attribute class is "0", and the upper limit value of the corresponding attribute class is "1", and therefore the result is 0+0.22×(1−0)=0.22". Since gender is binary, the value is rounded off to "0", that is, estimated to be a male.

By performing machine learning of taking the learning data (see FIG. 5) as the input image, extracting various feature amounts in the learning data, changing the configuration of the first half process or adjusting various parameters (connection weighting factor of the fully connected layer) such that the first output value of the first output layer for gender and the second output value of the second output layer for age approach a correct value (the gender, the age, and the range (class) to which the age corresponds) for the learning data of the input image on an overall average, so that the learned model 122 is generated by the optimized configuration and estimation parameters.

Thus, the plurality of attributes of the object to be estimated can be estimated collectively (or simultaneously) using the single learned model 122, and therefore it is possible to improve estimation accuracy while reducing the load on the estimation process by comparison with the conventional estimation methods (see FIG. 6 and FIG. 7). Further, it is possible to reduce the learning time of the learned model 122.

The estimation system 1 may include a generation processor that generates the learned model 122. In addition, the estimation system 1 may acquire the learned model 122 from the information processing device generated by the learned model 122. For example, the estimation system 1 may download the learned model 122 via the network and store the downloaded learned model 122 in the storage 12.

The estimation system 1 may also consist of a single information processing device (estimation device), which can be introduced (connected) to other devices. For example, the estimation system 1 may be built into a digital signage display. For example, the estimation system 1 may be built into a store terminal (POS terminal) of a store.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An estimation system comprising:
an acquisition circuit that acquires a captured image of an object to be estimated; and
an estimation circuit that uses a single learned model generated based on learning data, in which an image of the object to be estimated is associated with each of a plurality of attributes of the object to be estimated, to estimate a first attribute, included in the plurality of attributes, from a first output value of a first output layer corresponding to the first attribute and to estimate a second attribute, included in the plurality of attributes, from a second output value of a second output layer corresponding to the second attribute, with the captured image acquired by the acquisition circuit as an input image, wherein
the estimation circuit further estimates a candidate class based on the second output value calculated for each of a plurality of classes in which the second attribute is classified, and estimates the second attribute through linear interpolation using a plurality of candidate values included in the candidate class.

2. The estimation system according to claim 1, wherein the estimation circuit simultaneously estimates the first attribute and the second attribute.

3. The estimation system according to claim 1, wherein the estimation circuit calculates the first output value for each of a plurality of classifications of the first attribute, and estimates the first attribute for the input image based on a plurality of the calculated first output values.

4. The estimation system according to claim 1, wherein the estimation circuit outputs a total number of output values, which is a sum of a number of classifications of the first attribute and a number of classifications of the second attribute.

5. The estimation system according to claim 1, wherein the single learned model is generated based on learning data in which a face image of a person, a gender of the person, and an age of the person are associated with each other, the acquisition circuit acquires the face image of the person, and the estimation circuit uses the single learned model to estimate the gender of the person as the object to be estimated from the first output value of the first output layer corresponding to the gender of the person and to estimate the age of the person as the object to be estimated from the second output value of the second output layer corresponding to the age of the person, with the face image acquired by the acquisition circuit as the input image.

6. The estimation system according to claim 5, wherein the estimation circuit outputs a total number of output values, which is a sum of a number of gender classifications and a number of a plurality of classes of age classifications into which ages are classified.

7. The estimation system according to claim 6, wherein the estimation circuit estimates the age of the person as the object to be estimated based on i) a result of a product-sum operation of a plurality of second output values, including the second output value, associated with the plurality of classes of age classifications, and ii) age classes respectively corresponding to the plurality of second output values.

8. The estimation system according to claim 7, wherein the estimation circuit further estimates an age class, among the plurality of classes of age classifications, based on the result of the product-sum operation, and calculates an age corresponding to the second output value through linear interpolation using a minimum age and a maximum age, among a plurality of ages included in the estimated age class.

9. An estimation method performed by one or more processors, the estimation method comprising:

acquiring a captured image of an object to be estimated;

using a single learned model generated based on learning data, in which an image of the object to be estimated is associated with each of a plurality of attributes of the object to be estimated, to estimate a first attribute, included in the plurality of attributes, from a first output value of a first output layer corresponding to the first attribute and to estimate a second attribute, included in the plurality of attributes, from a second output value of a second output layer corresponding to the second attribute, with the acquired captured image as an input image; and estimating a candidate class based on the second output value calculated for each of a plurality of classes in which the second attribute is classified, and estimating the second attribute through linear interpolation using a plurality of candidate values included in the candidate class.

10. A non-transitory computer-readable recording medium of a device coupled to at least one processor of the device and storing one or more computer-executable instructions for estimation, the one or more computer-executable instructions, when executed by the at least one processor, causing the device to:

acquire a captured image of an object to be estimated;

use a single learned model generated based on learning data, in which an image of the object to be estimated is associated with each of a plurality of attributes of the object to be estimated, to estimate a first attribute, included in the plurality of attributes, from a first output value of a first output layer corresponding to the first attribute and to estimate a second attribute, included in the plurality of attributes, from a second output value of a second output layer corresponding to the second attribute, with the acquired captured image as an input image; and estimate a candidate class based on the second output value calculated for each of a plurality of classes in which the second attribute is classified, and estimate the second attribute through linear interpolation using a plurality of candidate values included in the candidate class.

* * * * *